Figure 1:
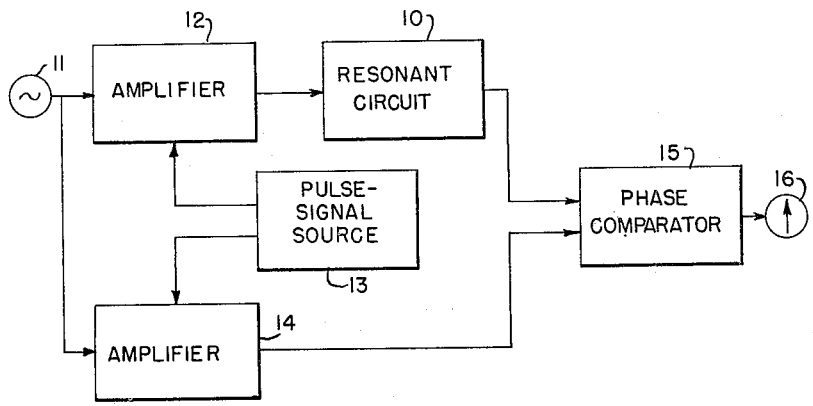

July 4, 1950   B. D. LOUGHLIN   2,513,731
FREQUENCY-RESPONSIVE SYSTEM
Filed Jan. 4, 1947   2 Sheets-Sheet 1

INVENTOR.
BERNARD D. LOUGHLIN
BY
ATTORNEY

July 4, 1950   B. D. LOUGHLIN   2,513,731
FREQUENCY-RESPONSIVE SYSTEM

Filed Jan. 4, 1947   2 Sheets-Sheet 2

*INVENTOR.*
BERNARD D. LOUGHLIN
BY
ATTORNEY

Patented July 4, 1950

2,513,731

UNITED STATES PATENT OFFICE 2,513,731

FREQUENCY-RESPONSIVE SYSTEM

Bernard D. Loughlin, Lynbrook, N. Y., assignor to Hazeltine Research, Inc., Chicago, Ill., a corporation of Illinois Application January 4, 1947, Serial No. 720,257

17 Claims. (Cl. 250—27)

The present invention relates to frequency-responsive systems and, particularly, to such systems for indicating or utilizing the frequency or change of frequency of an alternating potential applied thereto. While the invention is of general application, it has particular utility as a frequency detector in a wave-signal communication system and will be described in that connection.

A frequency detector, used in wave-signal communication systems to derive the modulation components of a frequency-modulated wave signal applied to the detector, is essentially a frequency-responsive system having an output which varies in magnitude and polarity with the frequency deviations of the wave signal on each side of its mean frequency. In these detectors, and in other systems of similar nature which must be responsive to changes of frequency of an alternating potential applied thereto, it is very desirable that the output shall be a linear function of input-signal frequency. This has not easily been accomplished in practice without undue complications and expense, particularly where the applied signal may have any frequency within a relatively wide range of frequencies. It is further usually desirable that such systems have zero output at a given frequency and a symmetrical or balanced output characteristic on either side of the given frequency. Prior arrangements of this nature have further usually been difficult to adjust for optimum linearity and balance and, once such adjustments have been made, are subject to impairment of these desired characteristics over prolonged periods of operation.

It is an object of the present invention, therefore, to provide a new and improved frequency-responsive system which avoids one or more of the disadvantages and limitations of prior such systems.

It is a further object of the invention to provide a new and improved frequency-responsive system particularly suitable for indicating the instantaneous frequency of a signal of unknown frequency applied thereto.

It is an additional object of the invention to provide a frequency detector in which linearity and balance of the frequency-detector response characteristic are easily attained in a new and improved manner.

It is yet another object of the invention to provide a frequency detector having a linearity and balance of response which is not only substantially improved but is more readily maintained over extended periods of operation.

It is a further object of the invention to provide a new and improved frequency detector having a linear characteristic over a much wider frequency range than heretofore readily obtainable in practice.

In accordance with a particular form of the invention, a frequency-responsive system comprises: an input circuit to which is applied a signal having a predetermined average frequency but an instantaneous frequency which may vary from the average frequency. The system also includes a resonant circuit having a resonant frequency related to the aforesaid average frequency, effectively having developed therein a signal of average apparent phase controlled relative to the applied signal. The frequency-responsive system further includes a phase comparator and control means for so controlling the phase comparator as to establish therefor recurrent responsive intervals having a periodicity much less than that of the applied wave signal yet at least twice as high as the highest cyclic variation of frequency thereof. The phase comparator is jointly responsive to the developed and applied wave signals during the recurrent responsive intervals for deriving a control effect having a magnitude varying with the relative instantaneous phase differences of the wave signals at the responsive intervals of the comparator, whereby the magnitude of the control effect varies with the frequency of the applied signal.

In accordance with a particular form of the invention, a frequency detector comprises: reference means for developing a reference signal having a frequency at least proximate to the range of frequency deviation of a frequency-modulated wave signal; and means operative during a first interval for synchronizing the operation of the reference means with the wave signal and for thereafter permitting the reference means to operate asynchronously. The detector includes phase-responsive means operative at the end of a second predetermined interval following the first interval and responsive primarily to the relative phases of the reference and wave signals for deriving a signal having a characteristic varying with the instantaneous frequency of the wave signal.

For a better understanding of the present invention, together with other and further objects thereof, reference is had to the following description taken in connection with the accompanying drawings, and its scope will be pointed out in the appended claims.

Figure 2:
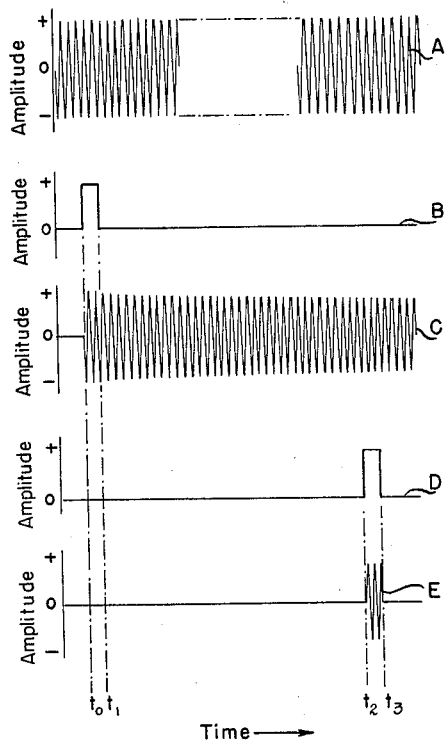
Figure 3:
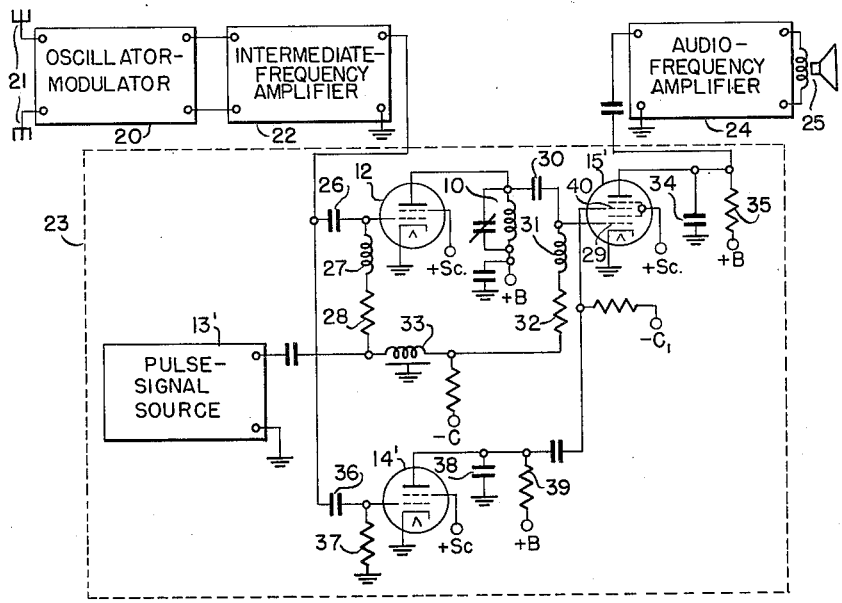
Figure 4:
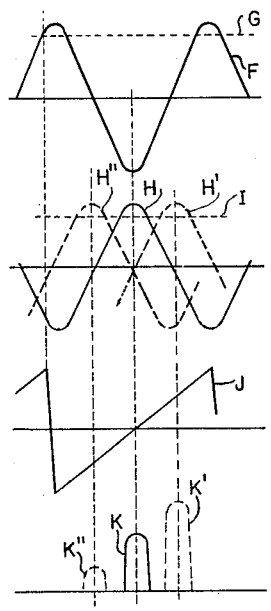

Referring now to the drawings, Fig. 1 represents schematically a frequency-responsive system embodying the present invention in a particular form; Fig. 2 graphically represents certain operating characteristics of the Fig. 1 system and is used as an aid in explaining its operation; Fig. 3 is a circuit diagram, partly schematic, representing a complete frequency-modulation receiver which includes a frequency detector embodying the present invention in a form essentially similar to that of Fig. 1; Fig. 4 graphically represents certain operating characteristics of the Fig. 3 frequency detector and is used to explain its operation; and Fig. 5 graphically represents the frequency-response characteristic of the Fig. 3 detector.

Referring now more particularly to Fig. 1 of the drawings, there is represented schematically a frequency-responsive system embodying the present invention in a particular form. The system includes reference means having a relatively stable frequency characteristic for developing a reference signal of predetermined frequency, this means comprising an oscillatory or resonant circuit 10 adapted upon excitation thereof to develop the reference signal. The resonant circuit 10 may comprise any suitable form of resonant circuit or may comprise a piezoelectric crystal.

The system also includes means operative during a first interval for synchronizing the operation of the reference means with a comparative signal, the average frequency of which is at least near the aforementioned predetermined frequency but the instantaneous frequency of which may vary from such average frequency, and for thereafter permitting the reference means to operate asynchronously. This means excites the resonant circuit during the first interval with the comparative signal, which is generated by a comparative signal source 11, and thereafter permits the resonant circuit to oscillate at its resonant frequency. The nature of excitation of the resonant circuit 10 is preferably a momentary shock excitation, the term "momentary" being used herein to designate an excitation interval which may include several cycles of the comparative signal of the source 11 but which is relatively short in comparison with a second and following interval during which the resonant circuit 10 is allowed to oscillate freely at its own resonant frequency. The means last mentioned comprises an amplifier 12, operating preferably in a class C mode of operation, which is rendered operative during the above-mentioned first interval by each pulse of a signal of periodic-pulse wave form generated by a signal source 13.

The system additionally includes phase-responsive means operative at the end of a second predetermined interval following the first-mentioned interval and responsive primarily to the relative phases of the reference and comparative signals for deriving a control effect varying with the cumulative phase difference existing between the reference and comparative signals at the end of the second interval. This means comprises an amplifier 14 operating as a class C amplifier and having an input circuit coupled to the comparative signal source 11 and an output circuit coupled to an input circuit of a phase comparator 15 which includes another input circuit coupled to the resonant circuit 10. The amplifier 14 has an amplification control circuit to which is applied either a delayed periodic-pulse signal generated by the source 13 or to which is applied a periodic-pulse signal generated by the source 13 and having pulses there- of intervening and spaced from the pulses of the signal applied to the amplifier 12. The output circuit of the phase comparator 15 is coupled to a meter 16 having a scale calibrated to indicate the frequency difference between the reference and comparative signals, the calibration being a frequency one since the cumulative phase difference existing between the reference and comparative signals at the end of the second interval is essentially a rate of change of phase or frequency difference.

Considering now the operation of the frequency-responsive system just described, and referring to the curves of Fig. 2, curve A represents the comparative signal of the source 11 and is assumed to be of sinusoidal wave form. One pulse of the signal generated by the source 13 and applied to the amplifier 12 is represented by curve B, the pulse initiating at time $t_0$ and having a pulse duration $t_0$—$t_1$. This pulse causes the amplifier 12 to become operative to translate the comparative signal of source 11 to the resonant circuit 10. One or more cycles of the comparative signal occurring during the interval $t_0$—$t_1$ thereupon shock-excite the resonant circuit 10 and set it into oscillation, the resonant circuit 10 continuing to oscillate at its own natural frequency after the period of excitation has passed, as represented by curve C. The reference signal thus developed by the resonant circuit 10 is applied to an input circuit of the phase comparator 15, but the latter develops no output by virtue of this signal alone since two signals are required before a phase comparison can be made.

One pulse of the signal generated by the source 13 and applied to the amplifier 14 is represented by curve D. This pulse is initiated at time $t_2$ and has a pulse duration $t_2$—$t_3$, the pulse occurring at the end of a predetermined interval $t_0$—$t_2$ following initiation of the pulse, represented by curve B, which was applied by the source 13 to the amplifier 12. The pulse applied to the amplifier 14 causes the latter to translate one or more cycles of the comparative signal of source 11 to an input circuit of the phase comparator 15, as represented by curve E. When this occurs, the reference signal developed by the resonant circuit 10 and the comparative signal translated by the amplifier 14 are simultaneously applied to the phase comparator 15.

If the reference signal and comparative signal have the same frequency, they will have the same relative phase at the time $t_2$ as they did at time $t_0$ so that the phase comparator 15 will develop and apply to meter 16 a signal indicative of this zero frequency difference. Should, however, the comparative signal have a frequency higher or lower than the reference signal, there will exist a cumulative phase difference between these signals at the time $t_2$ in favor of one or the other of the signals and this fact will cause the phase comparator 15 in comparing their relative phases to develop and apply to the meter 16 a signal indicative of such frequency difference.

While the foregoing operation has been described with reference to a single pulse of the signals applied from the signal source 13 to each of the amplifiers 12 and 14, it is preferable that these signals be of periodic-pulse wave form in order that the phase comparator 15 may periodically operate to apply to the meter 16 a signal indicative of the instantaneous frequency difference between the comparative and reference signals. Since the reference signal is developed by the resonant circuit 10 which may readily be constructed to have high frequency stability, as is well known, or as earlier mentioned may comprise a piezo-electric crystal, the reference signal may have a very precise known frequency. The frequency-responsive system of the invention is thus enabled to provide a continuous indication of the frequency of the comparative signal relative to a predetermined precise frequency which may be in the nature of a primary standard of frequency if sufficient precautions are taken with regard the constructional details of the resonant circuit 10 or when a piezoelectric crystal is employed.

Fig. 3 is a circuit diagram, partly schematic, of a complete frequency-modulation receiver which utilizes the frequency-responsive system of the present invention in the form of a frequency detector. In general, the receiver includes an oscillator-modulator 20 having its input circuit coupled to an antenna system 21 and having its output circuit coupled to an intermediate-frequency amplifier 22. Connected in cascade with the latter unit, in the order named, are a frequency detector 23, more fully described hereinafter, an audio-frequency amplifier 24, and a sound reproducer 25.

It will be understood that the various units just described may, with the exception of the frequency detector 23, be of a conventional construction and operation, the details of which are known in the art, rendering further detailed description thereof unnecessary. Considering briefly the operation of the receiver as a whole, and neglecting for the moment the detailed operation of the frequency detector 23 presently to be described, a desired frequency-modulated wave signal is selected by the oscillator-modulator 20 and converted to a frequency-modulated intermediate-frequency wave signal. This signal is applied to and amplified by the intermediate-frequency amplifier 22 and is then applied to the frequency detector 23, which derives the audio-frequency modulation components. The audio-frequency components are, in turn, amplified in the audio-frequency amplifier 24 and are reproduced by the sound reproducer 25 in a conventional manner.

Referring now more particularly to a portion of the receiver embodying the present invention, the frequency detector 23 is essentially similar to the frequency-responsive system described in connection with Fig. 1 and elements of Fig. 3 corresponding to similar elements of Fig. 1 are designated by similar reference numerals and analogous elements by similar reference numerals primed. The amplifier 12 has input electrodes coupled through a condenser 26 to the output circuit of the intermediate-frequency amplifier 22 and also coupled through a radio-frequency choke coil 27 and a resistor 28 to the output circuit of the pulse-signal source 13'. The resonant circuit 10, here shown as of the parallel-resonant type, is included in the output circuit of the amplifier 12. The phase comparator 15' includes a first control electrode 29 coupled through a condenser 30 to the resonant circuit 10 and coupled through a radio choke coil 31, a resistor 32, and a delay line 33 to the output circuit of the pulse-signal source 13'. The control electrode of the amplifier 12 is biased from a source, indicated as —C, to provide class C operation of the amplifier during each pulse of the source 13'. The value of the bias —C, the amplitude of the pulses of source 13', and the values of the condenser 26 and resistor 28 may if desired be so selected that the control electrode of tube 12 becomes conductive for a short interval during each positive half cycle of the intermediate-frequency signal applied from unit 22 to tube 12. The resultant bias developed in well-known manner across the condenser 26 and resistor 28 then causes tube 12 to limit the signal translated thereby to a substantially constant amplitude. This aids in rendering the detector 23 substantially unresponsive to undesired amplitude variations of the intermediate-frequency signal applied to the detector.

The bias of the source —C is also applied to the control electrode 29 of the phase comparator 15' to permit the latter to become conductive, insofar as the control electrode 29 is concerned, only during each delayed pulse of the source 13' and only on the most positive peak portion of each cycle of the oscillations developed by the resonant circuit 10. The output circuit of the phase comparator 15' includes an integration network comprising a condenser 34 coupled in shunt to the output electrodes of the comparator tube and a resistor 35 through which the anode of the comparator tube is energized from a source, indicated as +B.

The amplifier 14' is also coupled through a condenser 36 to the output circuit of the intermediate-frequency amplifier 22 and includes a resistor 37 coupled across its input electrodes to provide with the condenser 36 a self-bias arrangement for causing the amplifier 14' to operate in a class C mode of operation and, where desired, aiding the tube 12 to render the detector 23 unresponsive to undesired amplitude variations of the applied intermediate-frequency signal. The output circuit of the amplifier 14' includes an integration network comprising a condenser 38 coupled in shunt to the output electrodes of the amplifier tube and a resistor 39 through which the anode of the amplifier tube is energized from a source, indicated as +B. The output circuit of the amplifier 14' is coupled to a second control electrode 40 of the phase comparator 15', the control electrode 40 having an operating bias applied thereto from a source of bias potential indicated as —$C_1$.

Considering now the operation of the frequency detector just described, and referring to the curves of Fig. 4, the intermediate-frequency wave signal applied from the unit 22 to the frequency detector corresponds to the comparative signal mentioned with regard to the Fig. 1 system and is assumed to have a sinusoidal wave form as represented by curve F. The amplifier 12 is normally biased beyond anode-current cutoff by the bias source —C, and becomes conductive only during each pulse of the periodic-pulse signal applied to the amplifier from the source 13', the pulses being applied with positive polarity and of sufficient amplitude to overcome the bias of the source —C. The horizontal broken line G in association with curve F represents the level of anode-current cutoff bias of the amplifier 12, and it will be apparent that only the most positive peak portions of the applied wave signal produce anode-current flow as is characteristic of class C amplifier operation.

During each of these short intervals of anode-current flow, the amplifier 12 has a very low impedance and quickly damps any oscillations which may remain in the resonant circuit 10 from a previous interval of energization. At the same time, each such pulse of anode current shock-excites the resonant circuit 10 to initiate a new interval of excitation of the latter, the excitation interval being coextensive in time with the pulse duration of the signal applied to the amplifier 12 from the signal source 13'. One cycle of oscillation of the resultant reference signal developed by the resonant circuit 10 is represented in Fig. 4 by curve H. The amplifier 12 produces a phase shift of 180°, as is well known, so that the developed reference signal is 180° out of phase with the intermediate-frequency signal.

At the termination of a pulse of the signal of source 13', the amplifier 12 is again biased by the bias source —C to its inoperative state and the period of excitation of the resonant circuit 10 is terminated. The latter, however, continues to oscillate at its own resonant frequency and thus oscillates during the ensuing interval asynchronously with respect to the applied intermediate-frequency wave signal.

The reference signal developed by the resonant circuit 10 is applied to the control electrode 29 of the phase comparator 15', but does not cause the latter to become conductive since it is normally biased to anode-current cutoff by the bias source —C. At the end of a predetermined interval, however, that pulse of the signal of source 13' which caused the resonant circuit 10 to become excited is translated with a predetermined time delay through the delay network 33 and is applied with positive polarity to the control electrode 29 of the phase comparator 15' to overcome the bias —C and, for the duration of the pulse, to establish the bias of the control electrode 29 at a level indicated by the horizontal broken line curve I. The phase comparator 15' therefore becomes conductive during each positive peak of the reference signal.

At the same time, there is applied to the control electrode 40 of the phase comparator 15' a signal of saw-tooth wave form, represented by curve J, having an instantaneous frequency equal to that of the wave signal applied to the detector and having a constant phase relation thereto, this saw-tooth signal being derived in the following manner. The amplifier 14' operates as a class C amplifier so that the most positive peak portion of each cycle of the intermediate-frequency wave signal applied to the amplifier produces anode-current flow through the amplifier tube. Each such interval of anode-current flow causes the condenser 38, included in the output circuit of the amplifier, to become quickly discharged. In the intervals between these pulses of anode-current flow, the condenser 38 slowly charges from the energizing source +B through the resistor 39, thereby to develop the signal of saw-tooth wave form previously mentioned.

Assume that the reference signal developed by the resonant circuit 10 has the same frequency as a given instantaneous value of frequency of the intermediate-frequency wave signal applied to the detector 23. Under this assumed condition, the signal of saw-tooth wave form applied to the control electrode 40 of the phase comparator 15' and the reference signal developed by the resonant circuit 10 and applied to the control electrode 29 of the comparator initially have an approximately 180° phase difference and retain this same phase relationship throughout the interval following excitation of the resonant circuit 10. Thus when the pulse of the signal of source 13' is applied to the control electrode 29 of the phase comparator 15', the two signals applied to the control electrodes 29 and 40 of the phase comparator 15' produce pulses of anode current in the phase comparator tube, as represented by the solid line curve K of Fig. 4. Each such pulse of anode current has a magnitude varying with the amplitude of the saw-tooth signal during the interval when the most positive peak portions of the reference signal cause the phase comparator 15' to become conductive. These pulses of anode current are integrated by the integrating network comprising the condenser 34 and resistor 35 to derive across the resistor 35 a unidirectional potential of amplitude varying with the magnitude of the anode-current pulses of the phase comparator 15'.

Assume now that the intermediate-frequency wave signal applied to the detector 23 has an instantaneous frequency higher than the frequency of the reference signal developed by the resonant circuit 10. At the end of the predetermined interval established by the delay 33, the signal of saw-tooth wave form applied to control electrode 40 of the phase comparator 15' has a cumulative phase advanced with respect to the reference signal developed by the resonant circuit 10, as represented by the dash line curve H' of Fig. 4. The amplitude of the saw-tooth signal is now larger during the most positive peak portions of the reference signal with the result that the pulses of anode current through the phase comparator 15' are correspondingly larger, as represented by curve K'. The unidirectional potential developed across the resistor 35 in the output circuit of the phase comparator is thus correspondingly increased.

If it be alternatively assumed that the intermediate-frequency wave signal applied to the detector 23 has an instantaneous frequency lower than the frequency of the reference signal developed by the resonant circuit 10, the reference signal at the end of the predetermined time delay established by the delay network 33 has a cumulative phase advanced with relation to the saw-tooth signal applied to the control electrode 40 of the phase comparator 15'. This phase relationship is represented in Fig. 4 by the broken line curve H''. The pulses of anode current of the phase comparator 15' are now much smaller, as represented by curve K'', and the amplitude of the unidirectional potential developed across the resistor 35 in the output circuit of the phase comparator is correspondingly smaller.

It will be apparent from this that the unidirectional potential developed across the resistor 35 in the output circuit of the phase comparator 15' has an amplitude varying with the instantaneous frequency of the wave signal applied to the detector 23 and, consequently, that there is thus derived across the resistor 35 the modulation components of the intermediate-frequency wave signal. These components, as earlier mentioned, are applied to the audio-frequency amplifier 24 where they are amplified and applied to the sound reproducer 25 for reproduction in conventional manner.

The delay provided by the delay network 33 corresponds to the time interval $t_0 - t_2$ of Fig. 2 and is related to the maximum frequency difference to be encountered in practice between the intermediate-frequency wave signal applied to the detector 23 and the resonant frequency of the resonant frequency 10. In conventional frequency-modulation practice, the intermediate-frequency wave signal has a frequency deviation of 75 kilocycles above and below its mean frequency. Thus if the resonant circuit 10 has a resonant frequency equal to the mean frequency of the applied intermediate-frequency wave signal, the maximum frequency difference between the applied wave signal and the reference signal developed by the resonant circuit 10 will never exceed 75 kilocycles. If the delay network 33 provides a suitable value of delay, the maximum cumulative phase difference existing between the signals applied to the control electrodes 29 and 40 of the phase comparator 15' can never exceed 180° corresponding to the maximum frequency difference of 75 kilocycles mentioned. In practice, the phase comparison interval begins at time $t_1$ when the excitation of the resonant circuit 10 ceases and may conveniently be considered as terminating at a moment corresponding to the mean of the interval $t_2$—$t_3$ during which latter interval the phase comparator 15' develops its output signal. With this in mind, it will be apparent that the value of delay provided by the delay network 33 should be slightly less than approximately 6.66 microseconds so that the most positive peak portions of the reference signal applied to the control electrode 29 of the phase comparator 15' will always occur within the long linear portion of the saw-tooth signal applied to the control electrode 40 of the phase comparator 15'. The pulse duration of the signal generated by the signal source 13' may in practice be of the order of one microsecond or less and the pulse-repetition rate of this signal should preferably be at least twice the frequency of the highest frequency-modulation component of the received frequency-modulated wave signal.

Figure 5:
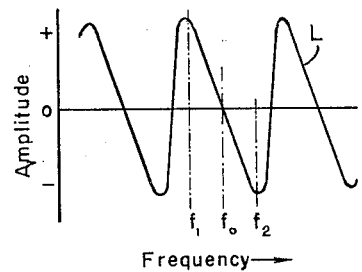

The frequency-response characteristic of the detector is graphically represented by curve L of Fig. 5 and is related directly to the wave form of the signal applied to the control electrode 40 of the phase comparator 15'. As shown by curve L, the detector has a linear frequency response when the latter signal is a linear sawtooth signal. Hence, the linearity of frequency response usually desired of a frequency detector may be easily and readily obtained in a frequency detector embodying the present invention by control of the linearity of the sawtooth signal applied to the phase comparator. This may easily be accomplished by suitable choice of the values of the condenser 38 and resistor 39, included in the output circuit of the amplifier 14', as is now well known. Another important characteristic of the frequency detector of the present invention is that the resonant frequency of the resonant circuit 10, this frequency being indicated as $f_0$ in Fig. 5, determines the center frequency of the frequency detector about which frequency the detector provides a balanced output. It is thus apparent that the general shape of the frequency-response characteristic and balance of the detector are established by entirely separate and independent factors. An additional important aspect of the detector is that the frequency range $f_1$—$f_2$, Fig. 5, between the positive and negative peaks of the frequency-response characteristic is determined primarily by the value of delay provided by the delay network 33 and may therefore be adjusted to any desired value quite independently of any adjustments made to attain a desired balance and linearity of the detector frequency-response characteristic. These are important advantages with regard to the design and adjustment of the detector for optimum performance and with regard to the high stability of the detector operating characteristics over an extended period of operation.

One difference may be noted between the frequency detector of Fig. 3 and the frequency-responsive system of Fig. 1. In the Fig. 3 arrangement, the intermediate-frequency wave signal of unit 22 is continuously applied to the input electrode 40 of the phase comparator 15' and the pulse signal of the source 13' after translation through the delay network 33 periodically renders the phase comparator 15' responsive to the reference signal developed by the resonant circuit 10. This is equivalent to inserting the pulsed amplifier 14 of the Fig. 1 arrangement between the resonant circuit 10 and one input circuit of the phase comparator 15, the other input circuit of the latter being then coupled directly to the comparative signal source 11.

It will be apparent from the foregoing description of the invention that a frequency-responsive system embodying the invention has unique and important advantages not heretofore readily obtainable. The system may be constructed and arranged to provide almost a primary standard of reference frequency, thereby to provide a precise indication of the unknown frequency of a signal applied thereto with a high degree of accuracy. A frequency detector embodying the invention may readily be made to have a very linear frequency-response characteristic and to have a balanced output at any desired frequency, these characteristics being easily and readily obtained independently of one another and remaining stable over extended periods of operation. A frequency detector embodying the invention also has the advantage that the frequency-response characteristic thereof may be made linear over a much wider frequency range than heretofore readily obtainable in practice and the width of this range may be readily adjusted quite independently of any adjustments for linearity and balance.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A frequency-responsive system comprising: reference means for developing a reference signal of predetermined frequency; means for synchronizing during a first interval the operation of said reference means with a comparative signal, the average frequency of which is at least near said predetermined frequency but the instantaneous frequency of which may vary from said average frequency, and for thereafter permitting said reference means to operate asynchronously; and phase-responsive means responsive primarily to the relative phases of said reference and comparative signals at the end of a second predetermined interval following said first interval for deriving a control effect varying with the cumulative phase difference existing between said reference and comparative signals at the end of said second interval; and a control means for controlling the operation of said synchronizing means during said first interval and the operation of said phase-responsive means following said second interval.

2. A frequency-responsive system comprising: reference means having a relatively stable frequency characteristic for developing a reference signal of predetermined frequency; means for synchronizing during a first interval the operation of said reference means with a comparative signal, the average frequency of which is at least near said predetermined frequency but the instantaneous frequency of which may vary from said average frequency, and for thereafter permitting said reference means to operate asynchronously; and phase-responsive means responsive primarily to the relative phases of said reference and comparative signals at the end of a second predetermined interval following said first interval for deriving a control effect varying with the cumulative phase difference existing between said reference and comparative signals at the end of said second interval; and a control means for controlling the operation of said synchronizing means during said first interval and the operation of said phase-responsive means following said second interval.

3. A frequency-responsive system comprising: reference means including an oscillatory circuit for developing a reference signal of predetermined frequency; means for synchronizing during a first interval the operation of said reference means with a comparative signal, the average frequency of which is at least near said predetermined frequency but the instantaneous frequency of which may vary from said average frequency, and for thereafter permitting said reference means to operate asynchronously; and phase-responsive means responsive primarily to the relative phases of said reference and comparative signals at the end of a second predetermined interval following said first interval for deriving a control effect varying with the cumulative phase difference existing between said reference and comparative signals at the end of said second interval; and a control means for controlling the operation of said synchronizing means during said first interval and the operation of said phase-responsive means following said second interval.

4. A frequency-responsive system comprising: a resonant circuit adapted upon excitation thereof to develop a reference signal of predetermined frequency; means for periodically momentarily shock-exciting said resonant circuit with a comparative signal the average frequency of which is at least near said predetermined frequency but the instantaneous frequency of which may vary from said average frequency; and phase-responsive means so controlled by said last-mentioned means as to be periodically operative during short intervals intervening between and spaced from said moments of shock excitation and responsive primarily to the relative phases of said reference and comparative signals for deriving a control effect varying with the instantaneous frequency of said comparative signal.

5. A frequency-responsive system comprising: an oscillatory circuit adapted upon excitation thereof to develop a reference signal of predetermined frequency; means including an amplifier for exciting during a first interval said oscillatory circuit with a comparative signal, the average frequency of which is at least near said predetermined frequency but the instantaneous frequency of which may vary from said average frequency, and for thereafter permitting said oscillatory circuit to oscillate at said predetermined frequency; and phase-responsive means responsive primarily to the relative phases of said reference and comparative signals at the end of a second predetermined interval following said first interval for deriving a control effect varying with the cumulative phase difference existing between said reference and comparative signals at the end of said second interval; and a control means for controlling the operation of said synchronizing means during said first interval and the operation of said phase-responsive means following said second interval.

6. A frequency-responsive system comprising: reference means for developing a reference signal of predetermined frequency; a source of control potential of pulse wave form; an amplifier operatively responsive to said control potential for translating to said reference means, for excitation thereof during a pulse of said potential, a comparative signal the average frequency of which is at least near said predetermined frequency but the instantaneous frequency of which may vary from said average frequency; and phase-responsive means operative at the end of an interval following said one pulse and responsive primarily to the relative phases of said reference and comparative signals for deriving a control effect varying with the cumulative phase difference existing between said reference and comparative signals at the end of said second interval.

7. A frequency-responsive system comprising: a resonant circuit adapted upon excitation thereof to develop a reference signal of predetermined frequency; a source of control potential of periodic-pulse wave form; an amplifier operatively responsive to each pulse of said control potential for translating to said resonant circuit, for excitation thereof during said each pulse of said potential, a comparative signal the average frequency of which is at least near said predetermined frequency but the instantaneous frequency of which may vary from said average frequency; and phase-responsive means periodically operative during intervals intervening between and spaced from said control potential pulses and responsive primarily to the relative phases of said reference and comparative signals for deriving a control effect varying with the instantaneous frequency of said comparative signal.

8. A frequency detector comprising: reference means for developing a reference signal having a frequency at least proximate to the range of frequency deviation of a frequency-modulated wave signal; means for synchronizing during a first interval the operation of said reference means with said wave signal and for thereafter permitting said reference means to operate asynchronously; and phase-responsive means responsive primarily to the relative phases of said reference and wave signals at the end of a second predetermined interval following said first interval for deriving a signal having a characteristic varying with the instantaneous frequency of said wave signal; and control means for controlling the operation of said synchronizing means during said first interval and the operation of said phase-responsive means following said second interval.

9. A frequency detector comprising: reference means including an oscillatory circuit for developing a reference signal having a frequency at least proximate to the range of frequency deviation of a frequency-modulated wave signal; means for synchronizing during a first interval the operation of said reference means with said wave signal and for thereafter permitting said reference means to operate asynchronously; and phase-responsive means responsive primarily to the relative phases of said reference and wave signals at the end of a second predetermined interval following said first interval for deriving a signal having a characteristic varying with the instantaneous frequency of said wave signal; and control means for controlling the operation of said synchronizing means during said first interval and the operation of said phase-responsive means following said second interval.

10. A frequency detector comprising: a resonant circuit adapted upon excitation thereof to develop a reference signal having a frequency at least proximate to the range of frequency deviation of a frequency-modulated wave signal; means for exciting during a first interval said resonant circuit with said wave signal and for thereafter permitting said resonant circuit to oscillate at its resonant frequency; and phase-responsive means responsive primarily to the relative phases of said reference and wave signals at the end of a second predetermined interval following said first interval for deriving a signal having a characteristic varying with the instantaneous frequency of said wave signal; and control means for controlling the operation of said first-mentioned means during said first interval and the operation of said phase-responsive means following said second interval.

11. A frequency detector comprising: a resonant circuit adapted upon excitation thereof to develop a reference signal having a frequency at least proximate to the range of frequency deviation of a frequency-modulated wave signal; means for periodically momentarily shock-exciting said resonant circuit with said wave signal; and phase-responsive means so controlled by said last-mentioned means as to be periodically operative during intervals intervening between and spaced from said moments of shock excitation and responsive primarily to the relative phases of said reference and wave signals for deriving the modulation components of said wave signal.

12. A frequency detector comprising: a resonant circuit adapted upon excitation thereof to develop a reference signal having a frequency at least proximate to the range of frequency deviation of a frequency-modulated wave signal; means including an amplifier for exciting said resonant circuit during a first interval with said wave signal and for thereafter permitting said resonant circuit to oscillate at its resonant frequency; and phase-responsive means responsive primarily to the relative phases of said reference and wave signals at the end of a second predetermined interval following said first interval for deriving a signal having a characteristic varying with the instantaneous frequency of said wave signal; and control means for controlling the operation of said first-mentioned means during said first interval and the operation of said phase-responsive means following said second interval.

13. A frequency detector comprising: a resonant circuit adapted upon excitation to develop a reference signal having a frequency at least proximate to the range of frequency deviation of a frequency-modulated wave signal; a source of control potential of pulse wave form; an amplifier operatively responsive to said control potential for translating to said resonant circuit, for excitation thereof during a pulse of said potential, said wave signal and for thereafter permitting said resonant circuit to oscillate at its resonant frequency; and phase-responsive means operative at the end of a second predetermined interval following said first interval and responsive primarily to the relative phases of said reference and wave signals for deriving a signal having a characteristic varying with the instantaneous frequency of said wave signal.

14. A frequency detector comprising: a resonant circuit adapted upon excitation to develop a reference signal having a frequency at least proximate to the range of frequency deviation of a frequency-modulated wave signal; a source of control potential of periodic-pulse wave form; an amplifier operatively responsive to each pulse of said control potential for translating to said resonant circuit, for excitation thereof during each said pulse of said potential, said wave signal; and phase-responsive means periodically operative during intervals intervening between and spaced from said potential pulses and responsive primarily to the relative phases of said reference and wave signals for deriving the modulation components of said wave signal.

15. A frequency-responsive system comprising: an input circuit to which is applied a signal having a predetermined average frequency but an instantaneous frequency which may vary from said average frequency; a resonant circuit, having a resonant frequency related to said average frequency, effectively having developed therein a signal of average apparent phase controlled relative to said applied signal; a phase comparator; and control means for so controlling said phase comparator as to establish therefor recurrent responsive intervals having a periodicity much less than that of said applied signal yet at least twice as high as the highest cyclic variation of frequency thereof; said phase comparator being responsive jointly to said developed and applied signals during said recurrent responsive intervals for deriving a control effect having a magnitude varying with the relative instantaneous phase differences of said signals at said responsive intervals of said comparator, whereby the magnitude of said control effect varies with the frequency of said applied signal.

16. A frequency-responsive system comprising: an input circuit to which is applied a signal having a predetermined average frequency but an instantaneous frequency which may vary from said average frequency; a resonant circuit, having a resonant frequency related to said average frequency, effectively having developed therein a signal of average apparent phase controlled in response to said applied signal; a phase comparator; and control means for so controlling said phase comparator as to establish therefor recurrent responsive intervals having a periodicity much less than that of said applied signal yet at least twice as high as the highest cyclic variation of frequency thereof; said phase comparator being responsive jointly to said developed and applied signals during said recurrent responsive intervals for deriving a control effect having a magnitude varying with the relative instantaneous phase differences of said signals at said responsive intervals of said comparator, whereby the magnitude of said control effect varies with the frequency of said applied signal.

17. A frequency-responsive system comprising: an input circuit to which is applied a signal having a predetermined average frequency but an instantaneous frequency which may vary from said average frequency; a resonant circuit, having a resonant frequency related to said average frequency, effectively having developed therein a signal of average apparent phase controlled by said applied signal; a phase comparator; and control means for so controlling said phase comparator as to establish therefor recurrent responsive intervals having a periodicity much less than that of said applied signal yet at least twice as high as the highest cyclic variation of frequency thereof; said phase comparator being responsive jointly to said developed and applied signals during said recurrent responsive intervals for deriving a control effect having a magnitude varying with the relative instantaneous phase differences of said signals at said responsive intervals of said comparator, whereby the magnitude of said control effect varies with the frequency of said applied signal.

BERNARD D. LOUGHLIN.

REFERENCES CITED

The following references are of record in the file of this patent:

UNITED STATES PATENTS

| Number | Name | Date |
|---|---|---|
| 2,332,540 | Travis | Oct. 26, 1943 |